United States Patent [19]

Arora

[11] Patent Number: 4,980,595
[45] Date of Patent: Dec. 25, 1990

[54] MULTIPLE MAGNETIC PATHS MACHINE

[75] Inventor: Ram S. Arora, Farmington, Mich.

[73] Assignee: Chrysler Corporation, Highland Park, Mich.

[21] Appl. No.: 346,336

[22] Filed: Apr. 27, 1989

Related U.S. Application Data

[63] Continuation of Ser. No. 123,758, Nov. 23, 1987, abandoned.

[51] Int. Cl.$^5$ .............................................. H02K 1/22
[52] U.S. Cl. .................................. 310/263; 310/156; 310/208
[58] Field of Search .................... 310/263, 190, 90, 62, 310/63, 254, 257, 184, 261, 68 D, 51, 114, 156, 198, 208

[56] References Cited

U.S. PATENT DOCUMENTS

| | | | |
|---|---|---|---|
| 769,090 | 8/1904 | Johnson | 310/263 |
| 3,132,272 | 5/1964 | MacFarlane | 310/263 |
| 3,183,387 | 5/1965 | Wasynczuk | 310/263 |
| 3,206,623 | 9/1965 | Snowdon | 310/263 |
| 3,252,025 | 5/1966 | Brown | 310/263 |
| 3,305,740 | 2/1967 | Shano | 310/263 |
| 3,423,619 | 1/1969 | Shaw | 310/263 |
| 3,452,228 | 6/1969 | Wolley | 310/263 |
| 3,553,511 | 1/1971 | Hemmings | 310/263 |
| 3,555,327 | 1/1971 | Terry | 310/263 |
| 3,571,637 | 3/1971 | Henningsen | 310/263 |
| 3,646,376 | 2/1972 | Anderson | 310/263 |
| 4,110,642 | 8/1978 | Thiele | 310/51 |
| 4,614,889 | 9/1986 | Ikegami | 310/263 |

FOREIGN PATENT DOCUMENTS 0112008  9/1964  Czechoslovakia ................ 310/263

*Primary Examiner*—R. Skudy
*Attorney, Agent, or Firm*—Mark P. Calcaterra

[57] ABSTRACT

Separate multiple flux paths for an electrical generator or motor are provided in a single rotor machine by axially mounting a plurality of pole structures on the rotor shaft. Each pole structure includes a pair of interleaved claw-type pole pieces forming each separate path, with an excitation source sandwiched between the pole pieces. The excitation source in at least one of the pole structures comprises a non-magnetic sleeve mounted on a shaft of the rotor between the pole pieces and an annular permanent magnet mounted on the sleeve. The excitation source in at least one other of the pole structures comprises a permeable core mounted on the rotor shaft between the pole pieces and a conductive coil encircling the core.

1 Claim, 6 Drawing Sheets

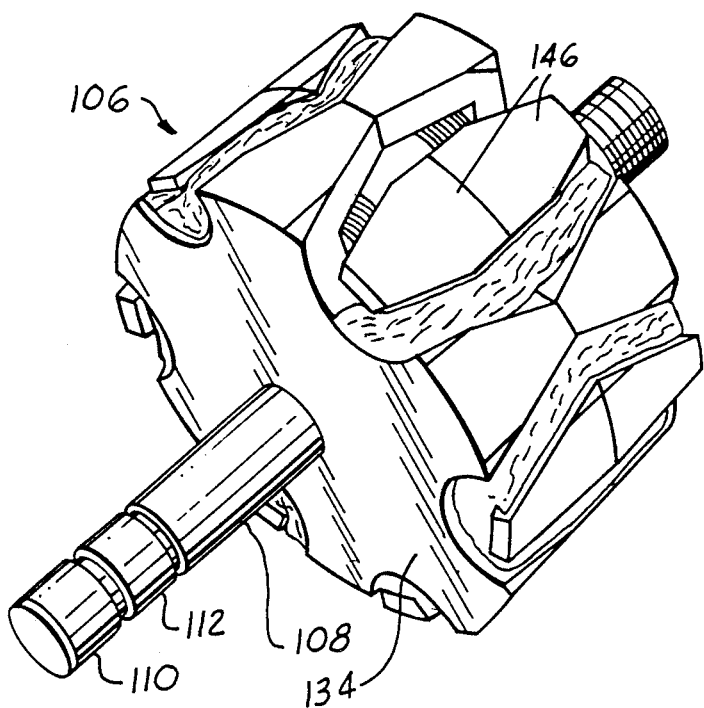
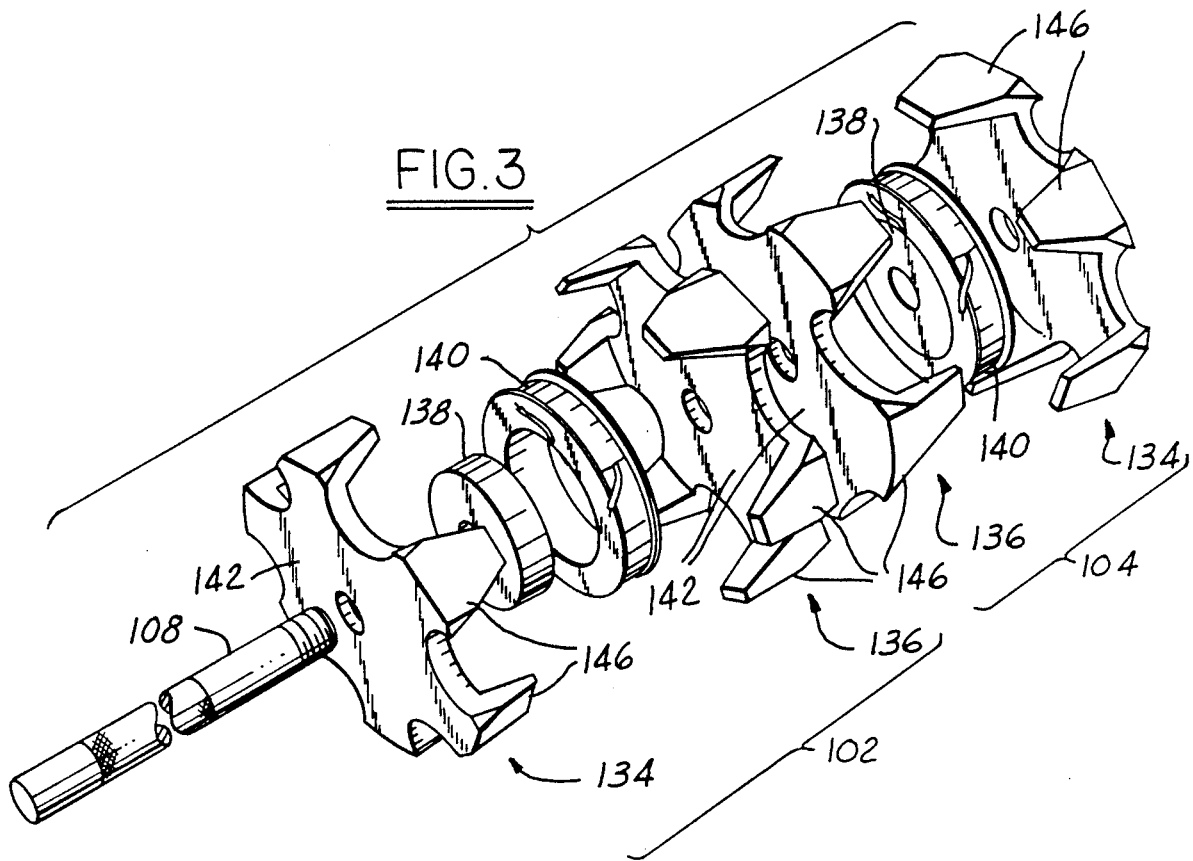

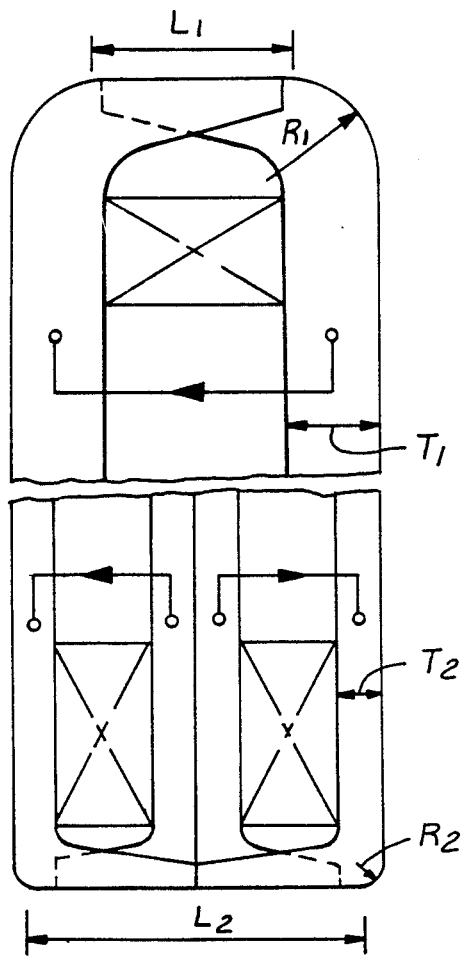
FIG.3A
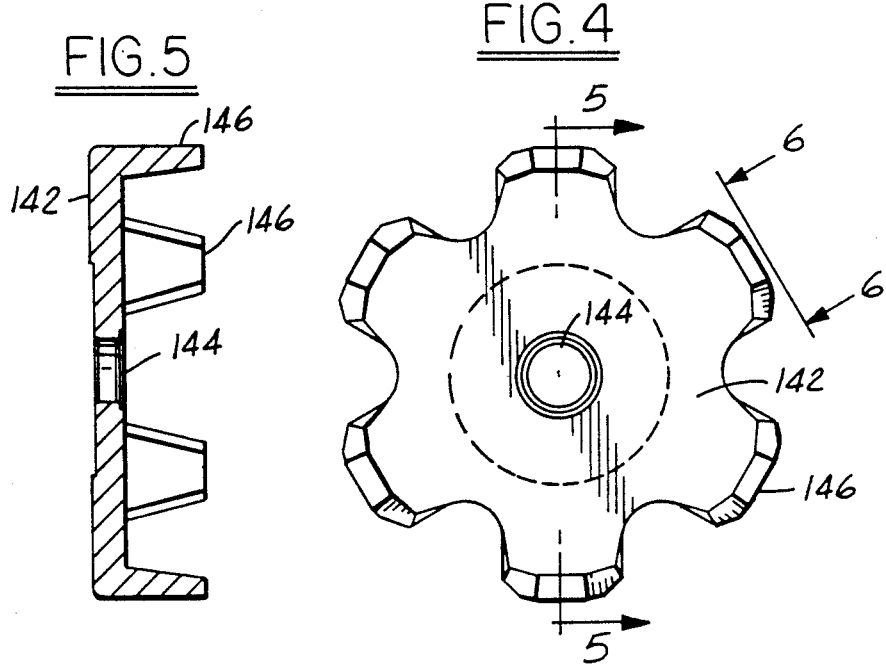
FIG.5
FIG.4
FIG.6

MULTIPLE MAGNETIC PATHS MACHINE

This is a continuation of U.S. Ser. No. 07/123,758 filed Nov. 23, 1987 now abandoned.

BACKGROUND OF THE INVENTION

1. Field of the Invention

This invention relates generally to electrical machines and more particularly to an electrical generating machine or motor having multiple magnetic paths in a single rotor machine.

2. Description of the Related Art

Electrical power machines, both generators and motors, which convert mechanical energy into electrical energy and visa versa have been built for about a century. These machines have been both direct current (DC) and alternating current (AC) types. The conversion of mechanical energy into electrical energy and visa versa, is accomplished by relative motion between magnetic fields and current carrying conductors.

Conventional electrical machines, both generators and motors provide this relative motion between a conductor assembly and a component assembly producing a magnetic field. This movement is generally rotational about a central axis. The moving or rotating component assembly of the electrical machine is generally called a rotor and the stationary component is generally called a stator. As the rotor is turned in the case of a generator, producing the relative motion described above, magnetic lines of flux pass through the conductors producing an electromotive force in the conductors.

Conventional motors likewise require relative motion between a conductor assembly and a magnetic field in order to function. In general, the rotor being driven mechanically or the stator being driven electrically determines whether the machine operates as a generator or a motor respectively.

In a generator, if the magnetic flux is increased, higher current will be produced in the conductors cut by the passing magnetic field and therefore the output of a generator is increased. Similarly, increasing the rotational speed of the rotor may also increase the output current.

Conversely, in a motor, increased current fed to the rotor and in turn being cut by the magnetic field of the stator will produce a higher mechanical torque output.

The primary difference between a motor and a generating machine involves the application of energy input. In a generator, either DC or AC, the rotor is mechanically driven providing the relative motion between a magnetic field and current carrying conductors. In a motor, a rotating magnetic field is provided by electrically driving the stationary stator. The rotating field then induces mechanical rotation of the rotor thus changing electrical energy into mechanical energy.

The following discussion centers on a description of an electrical generating machine. However, the description is similarly applicable to an electrical motor machine.

A variety of designs of generating machines have been developed and placed in commercial use. Objectives of designers and manufactures of these machines have always been the optimization of the power to weight ratio, minimizing the cost, space required, and speed required, increasing efficiency, increasing reliability, decreasing failure rates, noise, and internal temperature rise, etc.

The rotor in a typical electrical generator comprises a central rotor shaft, a core made of a high magnetic permeability material such as iron mounted on the shaft, and a current carrying coil wound onto the core, and two high permeability structures generally called pole pieces enclosing the core and coil. The rotor core and pole pieces may be integral parts of a pole structure. The pole pieces are shaped to form north and south opposing magnetic poles when electrical current is passed through the coil. At one end of the rotor shaft are positioned slip rings for passing electrical exciter current from the stationary portion of the machine to the coil mounted on the rotor.

The rotor may be constructed utilizing an electrical current carrying coil and pole pieces as described above forming electromagnets or by utilizing suitable permanent magnets positioned on the shaft.

Surrounding the rotor is the stator. The stator is generally cylindrical in shape and comprises ring shaped laminations of high permeability material. These laminations are wound with electrically conductive wire and positioned in a spacial configuration surrounding the rotor in the generator housing so as to generate electromagnetic force (EMF) when there is relative motion between the rotor and stator. This EMF causes the flow of electrical current within the windings of the stator when loaded.

Particularly for small electrical power generating machines and specifically for use in motor vehicles, the claw pole alternator has achieved wide acceptance as the most efficient means for producing electrical power for use in an automobile.

In a claw pole alternator, the pole structure is basically a pair of pole pieces generally made of flat circular metal plates having central bores positioned axially on the rotor shaft on either side of the rotor core and coil. Each pole piece has projecting fingers or claws which are bent over the rotor coil in a direction parallel to the rotor axis. When so bent and positioned, each claw interposes between claws of the opposite pole piece. The pole pieces may be manufactured by metal stamping, forging, machining, or other manufacturing processes.

When current is passed through the coil the claws become electromagnetic poles of opposite polarity. As the rotor is rotated, these poles having opposite polarity a magnetic field which alternates in polarity as seen by the stator winding conductors thus producing alternating current at the output of the alternator. In automotive applications, this alternating current (AC) is generally rectified into DC for use in the automotive electrical systems. The AC may also be used directly.

In order to clearly illustrate the differences between conventional machines and the present invention, a discussion of a conventional machine shown in FIGS. 9 and 10 is believed appropriate at this point. FIG. 9 shows a conventional claw pole alternator in exploded perspective view illustrating the relationship of major components. Rotor assembly 10 is placed within stator and end shield assembly 12. On each end of rotor assembly 10 is positioned a bearing 14, each correspondingly fitting within a bearing race, one carried by stator and end shield assembly 12 and one carried by end shield 16. Rotor assembly 10 is enclosed by stator and end shield assembly 12 and end shield assembly 16 mated and held together by a number of bolts 18.

The shaft portion 20 of rotor assembly 10 extending through stator and end shield assembly 12 is fixed to pulley 22 which is in turn belt driven by a prime mover (not shown). On the opposite end of the rotor assembly, shaft 20 extends through end shield 16. Rectifier assembly 24 is bolted to end shield 16. Brush assembly 26 is in turn bolted to rectifier assembly 24 and rectifier assembly cover 28 is in turn positioned over rectifier assembly 24 and brush assembly 26 and secured to end shield 16.

The assembled internal structure of rotor assembly 10 in the conventional claw pole alternator is shown in FIG. 10. As shown, this machine is a twelve pole synchronous AC generator having a single pole structure rotor. Fixed to rotor shaft 20 is a pole structure comprising a pair of pole pieces 30 and 32. Each pole piece 30 and 32 is identical and comprises disc portion 34 having a centrally disposed bore 36 and six equally spaced apart projections or claws 38 which are bent approximately 90° from the plane of disc portion 34 and extend from the outer portion of disc portion 34 so as to project parallel to the axis of shaft 20 over coil 42.

Pole pieces 30 and 32 are positioned on shaft 20 with claws 38 facing in opposite directions and positioned so that claws 38 on pole piece 30 are interposed between claws 38 of pole piece 32. Between pole pieces 30 and 32 mounted on shaft 20 is rotor core 40 which is comprised of a material having a high permeability such as iron or an iron laminate structure. Rotor core 40 is of cylindrical shape having a centrally disposed bore for mounting on shaft 20. Positioned over rotor core 40 is rotor coil 42. The combination of core 40 and adjacent pole pieces 30 and 32 with claws 38 effectively surround rotor coil 42.

When an electrical current is passed through rotor coil 42, a magnetic flux is set up in pole pieces 30 and 32, effectively making pole pieces 30 and 32 magnet poles having opposite polarity. Thus claws 38 on pole piece 30 will have one magnetic, polarity when claws 38 on pole piece 32 have the opposite magnetic polarity. Thus a rotor having twelve poles on the periphery thereof is created.

Positioned outside of assembly 10 is stator core 44 surrounding rotor assembly 10. Stator windings 46 ar in turn wrapped around stator core 44. In order to provide cooling to these stator and rotor windings, fan 48 is attached to shaft 20 adjacent stator and end shield assembly 12.

In conventional design motors, generators and alternators, the rotor assembly includes a single pole structure comprising a set of two pole pieces, a coil and a core. The core may be an integral part of the pole pieces. The geometry of the pole structure depends upon the total flux it has to carry, the maximum rotational speed it must withstand, the method of manufacturing, noise characteristics, etc.

For a given unit size, then, optimizing all parameters in a conventional electrical generating machine or motor machine will allow the production of a certain fixed capacity. Thus if the electrical circuit needs or mechanical torque requirements are greater than this capacity, then either a larger electrical generating or motor unit is needed or an additional unit is needed in order to supply the requirements of the load. Particularly for automotive applications, where space is at a premium, these alternatives are undesirable.

The designs which have been produced for many decades have had limitations and problems of which the following are exemplary. First, present alternator designs have generally low efficiencies. Particularly where increased alternator outputs and smaller engine size are important, efficiency has become extremely important. Second, in present alternator designs, in order to achieve a higher output, longer projecting claws are required. In addition, higher speeds are required which produce excessive noise which is difficult to prevent. Third, relatively thick pole pieces and long claws are required to carry the necessary magnetic flux. Finally, increase in the output of present machines causes winding temperatures to also rise, posing an additional thermal limitation on the design.

SUMMARY OF THE INVENTION

It is an object of the present invention to increase the achievable output of a generating or motor machine having a given size beyond that presently achievable in conventional designs.

It is a further object of the present invention to increase the efficiency of a generating or motor machine significantly beyond that presently achievable in conventional designs.

It is a still further object of the present invention to lower rotor noise levels below that presently achievable in conventional designs.

These and other objects and of the invention are achieved by utilizing multiple magnetic pole structures stacked axially on the rotor shaft to create multiple flux paths, whereas current designs utilize a single rotor pole structure providing a single magnetic flux path. This multiplicity of pole structures providing multiple flux paths produces a higher total flux than has previously been attainable thus allowing an improved output capability.

By providing multiple pole structures positioned axially along the rotor shaft adjacent to one another which creates multiple magnetic flux paths, conductors within the stator are cut by the higher flux produced in the rotor per unit angular displacement of the rotor thus producing a higher output current in a generator having given parameters.

In the multiple pole structure designs encompassed by the present invention, for any total flux that is needed for a particular design, the core and pole cross sectional areas are approximately inversely proportional to the number of pole structures utilized. In other words, if two pole structures are utilized producing two separate magnetic flux paths, the cross sectional area per pole structure required for a given total flux is cut in about half. If three pole structures are utilized producing three separate magnetic flux paths, the total core and pole cross sectional area per pole structure required for a given flux is reduced to about one-third compared to that area required in a single pole structure design. This reduction in cross sectional area consequently reduces the weight and/or cost of the resulting rotor structure for any total magnetic flux. Also, the pole piece claws can be shorter resulting in overall less noise, requiring fewer ampere turns for a given amount of flux produced, and the pole claw shape can be made closer to an ideal shape thus lowering the air gap flux density.

Conversely, for a given alternator structure size, the magnetic flux producible may be greatly increased in accordance with this invention thus increasing the output capability for a generator of given size. In addition, for a generator of given size, a longer stator core may be utilized as well as stator windings with fewer turns. This results in a lower temperature rise, and of course an increase in overall unit efficiency.

Therefore, the present invention is capable of meeting the increased current requirements of vehicles without the necessity for providing additional generating units by virtue of increasing the output capacity of a single generating unit using the present invention.

Another feature of the present invention is that in the multiple pole structure rotor design, some pole structures may be constructed using suitable permanent magnet materials and some structures may be constructed using coils carrying exciter current. The current carrying coils may then be utilized to control the total flux produced in the rotor and thus the output of the generating assembly.

Similarly, the multiple pole structures, creating multiple flux paths, of the present invention may be utilized in an electrical motor to provide a higher, more efficient mechanical output and smaller overall size than achievable in conventional machines.

Further objects, features and advantages of this invention will become more apparent from a consideration of the following detailed description of a preferred embodiment when taken in conjunction with the appended claims and accompanying drawings.

BRIEF DESCRIPTION OF THE DRAWINGS

FIG. 2 is a perspective view of the rotor assembly of the present invention having two pairs of 12 pole design pole structures;

FIG. 3 is an exploded perspective view of the rotor assembly of the present invention shown in FIGS. 1 and 2.

FIG. 3A is a sectional schematic comparison of a conventional single pole structure rotor compared to the improved design according to the present invention having two pole structures;

FIG. 4 is a front view of a pole piece of a claw pole alternator;

FIG. 5 is a sectional view taken in the direction of line 5—5 in FIG. 4;

FIG. 6 is a partial side view of the pole piece in FIG. 4 in the direction of lines 6—6;

DETAILED DESCRIPTION OF THE PREFERRED EMBODIMENT

The following description specifically refers to an illustrated alternator according to a preferred embodiment of the present invention. The present invention applies equally well to DC generators and both AC and DC motors. The teachings in the detailed description that follows are merely illustrative, showing one preferred embodiment of the present invention.

Figure 1:
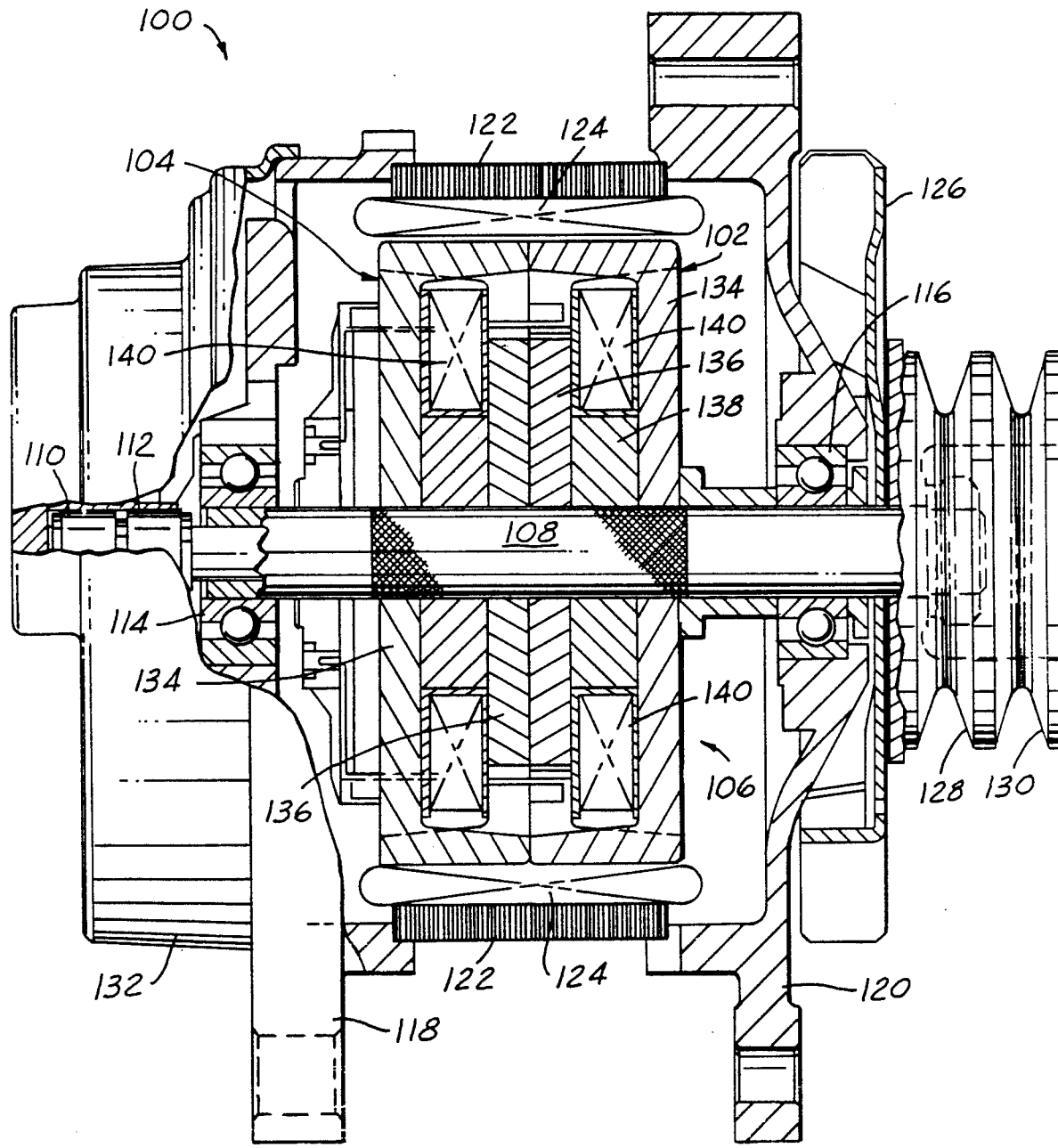
FIG. 1 is a side view with portions broken away to illustrate a claw pole alternator according to the present invention having two rotor pole structures.

A claw pole alternator assembly 100 according to a preferred embodiment of the present invention having two pole structures 102 and 104 is shown in FIG. 1.

Rotor assembly 106 comprises shaft 108, rotor pole structures 102 and 104 mounted on shaft 108, and a pair of slip rings 110 and 112 mounted on one end of shaft 108. Rotor assembly 106 is rotatably supported by bearings 114 and 116 which are in turn supported respectively by end shield 118 and stator and end shield assembly 120. Mounted between end shields 118 and 120 is stator core 122 and stator winding 124. Stator core 122 is essentially a stacked series of generally ring shaped discs of high permeability material such as iron. Wrapped around the stator core is stator winding 124. Although not shown in the view of FIG. 1, stator core 122 presents a toothed surface inward toward the outer surface of rotor pole structures 102 and 104. In order to provide some cooling to the stator windings during alternator operation, fan 126 is fixed to shaft 108 outside end shield 120. Adjacent fan 126 and also fixed to shaft 108 are drive pulleys 128 and 130. These pulleys are in turn belt driven from a prime mover (not shown).

On the opposite end of the rotor assembly to pulleys 128 and 130, shaft 108 extends through end shield 118 and into cover 132. Although not shown, a conventional rectifier assembly is bolted to end shield 118 along with a brush assembly. The brush assembly holds brushes which make contact with slip rings 110 and 112 to transfer electrical current from an electrical power source such as a battery to the rotating coils 140 on rotor assembly 106.

The internal structure of rotor assembly 106 in the claw pole alternator according to the present invention is shown in FIG. 1 having two rotor pole structures 102 and 104, each creating a separate magnetic flux path during alternator operation. Fixed to rotor shaft 108, each rotor pole structure 102 and 104 comprises a pair of pole pieces 134 and 136, a core 138, and coil 140.

As shown in FIGS. 4, 5, and 6, each pole piece 134 and 136 is identical and comprises disc portions 142 each having a centrally disposed bore 144 and six equally spaced apart projections or claws 146 which are bent approximately 90° from the plane of disc portion 142 and extend from the outer portion of disc portion 142 so as to project parallel to the axis of shaft 108 and extend over coil 140 when pole pieces 134 and 136 are mounted on shaft 108.

Pole pieces 134 and 136 are positioned on shaft 108 with claws 146 facing in opposing directions and positioned so that claws 146 on pole piece 134 are interposed between claws 146 on pole piece 136. Between pole pieces 134 and 136 mounted on shaft 108 is rotor core 138 which is comprised of a material having a high permeability such as iron or an iron laminate structure. Rotor core 138 is of cylindrical shape having a centrally disposed bore to fixedly position core 138 on shaft 108. Positioned over rotor core 138 is coil 140. The combination of core 138 and adjacent pole pieces 134 and 136 with claws 146 effectively surround rotor coil 140.

When an electrical current is passed through rotor coil 140 a magnetic flux is set up in pole pieces 134 and 136, effectively making pole pieces 134 and 136 magnet poles having opposite polarity. Thus claws 146 on pole piece 134 will have one magnetic polarity when claws 146 on pole piece 136 have the opposite magnetic polarity. Thus a rotor pole structure having twelve poles on the periphery thereof is created. In addition, a single flux path is created around coil 140.

Since there are two pole structures 102 and 104 mounted adjacent one another on shaft 108, two axially spaced flux paths will be created when current is supplied to both coils 140 in the two structures. Pole structures 102 and 104 are two like structures positioned back-to-back as shown in FIG. 1 and also shown in FIGS. 2 and 3. Pole pieces 134 and 136 are identical and interchangeable. Consequently, the combination of pole pieces 136 shown adjacent one another in FIG. 1 may be two pole pieces adjacent one another or may be formed from a single disc of permeable material having opposing T-shaped projecting claws.

In FIG. 3A, a single claw pole structure as in a conventional claw pole rotor assembly is shown in the upper portion in partial schematic section, compared to the rotor assembly of the present invention shown in the lower portion having two pole structures each with a pair of pole pieces to illustrate the features of the present invention.

There is a limiting relationship between fee thickness, length of the claw, and the bend radius of the claw in pole pieces made by metal stamping. In the conventional claw pole rotor design, claw length L1 requires a corresponding bending radius R1 and a corresponding pole forming structure thickness T1 in order to prevent excessive bending and fatiguing of the claw as the rotor is rotated. When multiple claw pole assemblies as in the present invention are utilized, thinner pole forming structures may be constructed so as to acceptably have a smaller bend radius.

Accordingly, as shown in the sectional view of the present invention in FIG. 3A, thickness T2 and bend radius R2 are less than the values T1 and R1 previously attainable. Similar advantages are attainable when other manufacturing processes are used.

Multiple flux circuits reduce the total reluctance of the magnetic paths and thus increase the resultant flux in a given space. Correspondingly, as this increased number of lines of flux present in the rotor design of the present invention cuts the windings in the stator, an increased EMF is realized.

In addition, since the length of the claws 146 is shorter than the length of claws required in a comparable alternator having a single rotor pole structure assembly, the center of gravity of the claw is closer to the disc portion area. Consequently the bending moment during high speed operation will be reduced. In addition, the trapazoidal shape of the claw may therefore be changed to more closely approximate an ideal shape to optimize electrical and magnetic characteristics thus further enhancing the output of the machine.

For example, in comparison tests with a conventional high speed claw pole alternator of similar size, weight, and service, an alternator using a two pole structure rotor according to the present invention demonstrated an efficiency of 51 percent compared to a demonstrated efficiency of 35 percent in the comparable alternator at highway equivalent speeds while at the same tim: producing over 6.4 amps per pound compared to just over 6 amps per pound for the comparable alternator. Conversely, for the same output, where a comparable conventional alternator would need 5.4 horsepower input, the alternator of the present invention would require only 3.7 horsepower input. A similar comparison between a conventional motor and a motor constructed according to the present invention would yield similar results for a particular electrical input.

Figure 7:
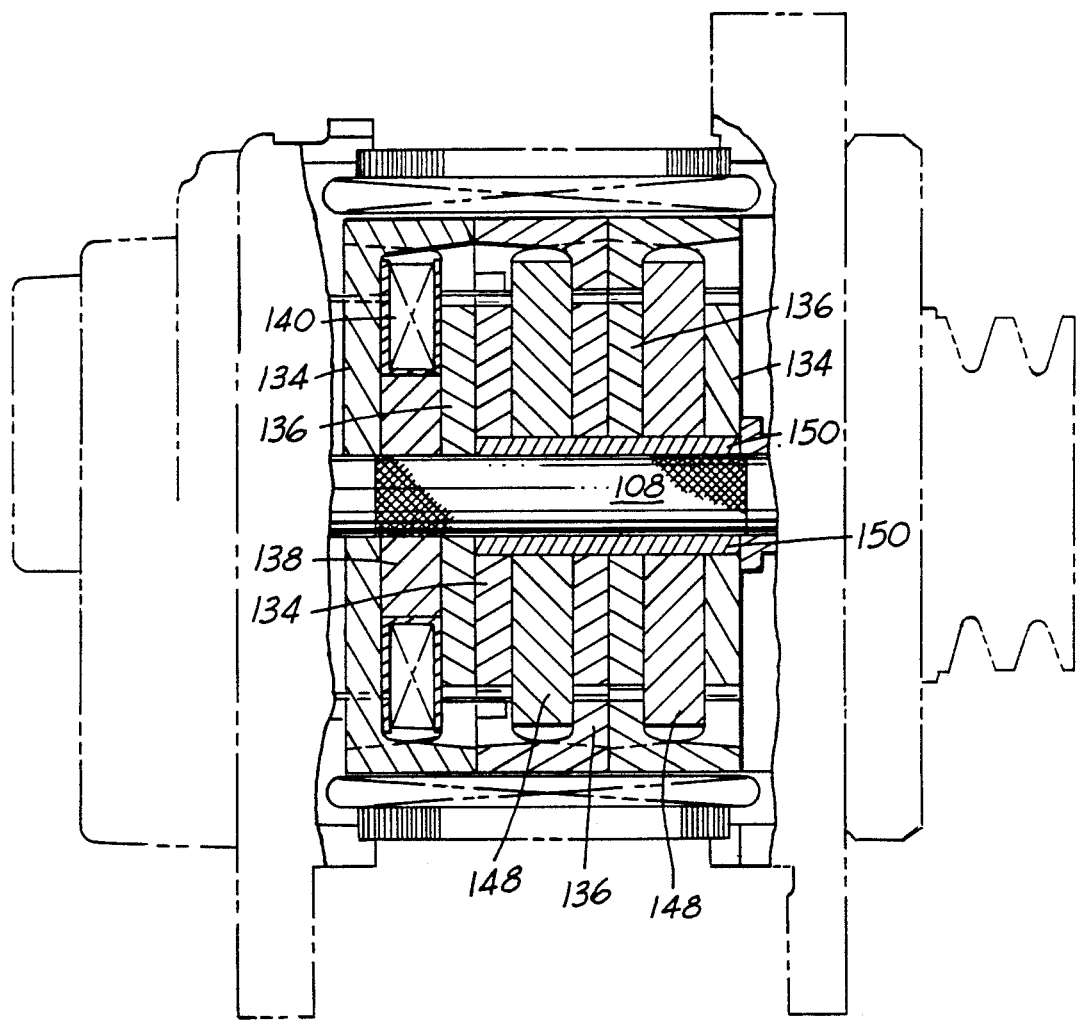
FIG. 7 is an alternator assembly according to the present invention having a rotor with three magnetic pole structures.

Another embodiment of this invention is shown in the alternator assembly of FIG. 7 having three rotor pole structures. At least one of the pole structures may be comprised of a pair of pole pieces 134 and 136 and a permanent magnet 148 sandwiched therebetween. In FIG. 7, two pole structures are so constructed.

In pole structures using permanent magnets, a cylindrical sleeve of non-magnetic material 150 such as aluminum must be disposed between rotor shaft 108 and pole pieces 134 and 136 to ensure that the magnetic flux path is not short circuited through shaft 108. If all pole structures are each comprised of a permanent magnet and two pole pieces, no excitation power would be required.

Alternatively, one of the pole structures could be produced as described above having a permeable core and a rotor coil and the other pole structures comprised of permanent magnets as shown in FIG. 7. In this embodiment the coil current is varied and reversed to control the total flux produced in the rotor which in turn controls the total current produced in the stator. In this way the alternator output can be varied from zero to the desired maximum without the use of switching devices in the voltage regulation circuitry and thus would be simpler in design.

Figure 8:
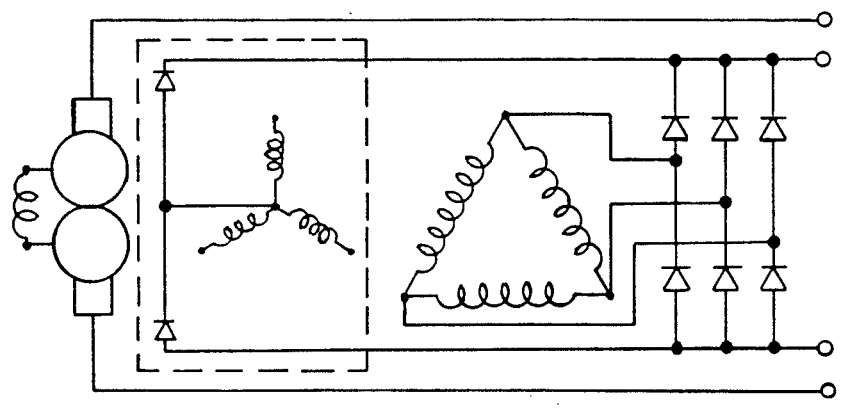
FIG. 8 is an electrical schematic of a typical three-phase alternator.
Figure 9:
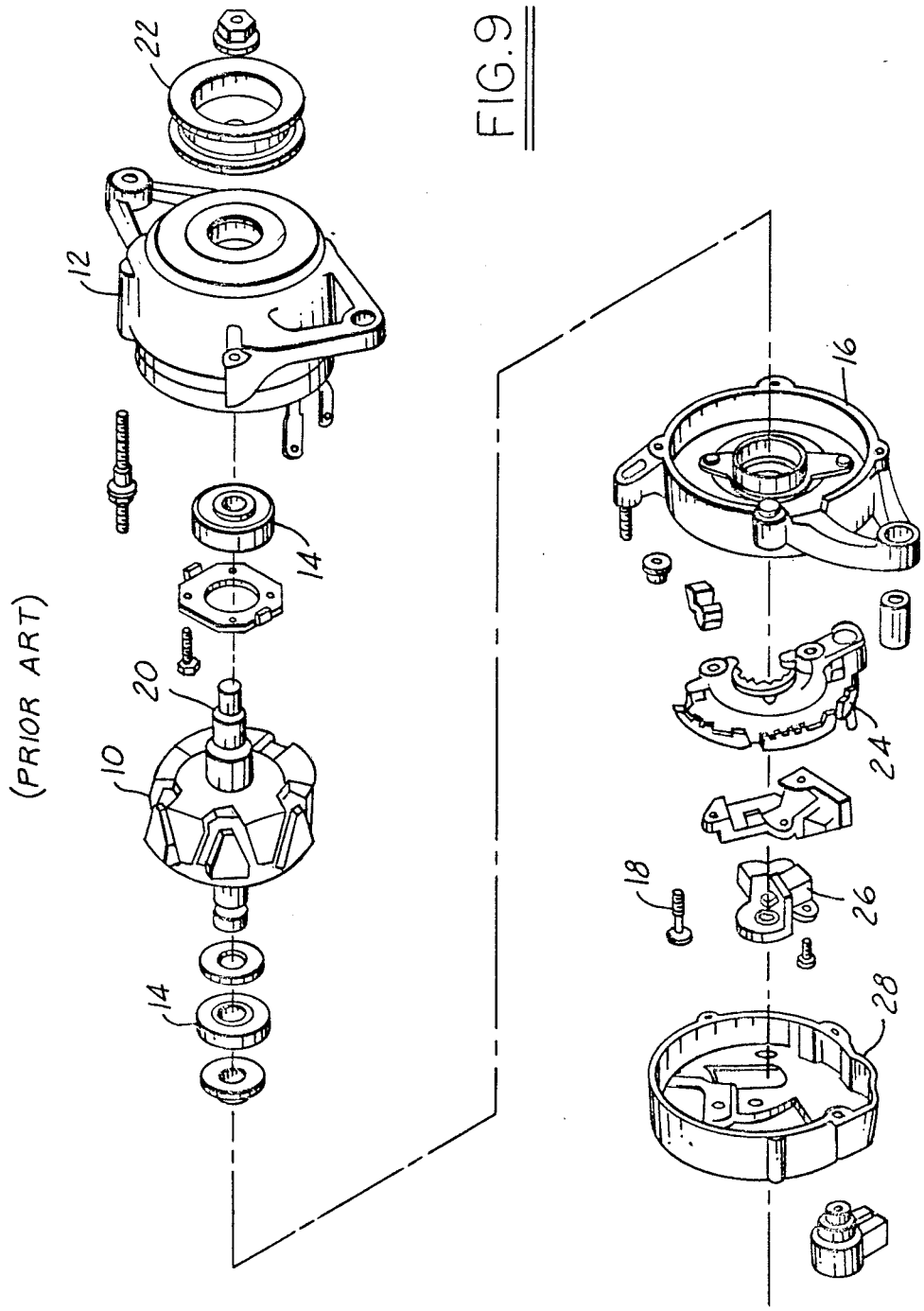
FIG. 9 is an exploded perspective view of a prior art claw pole alternator.
Figure 10:
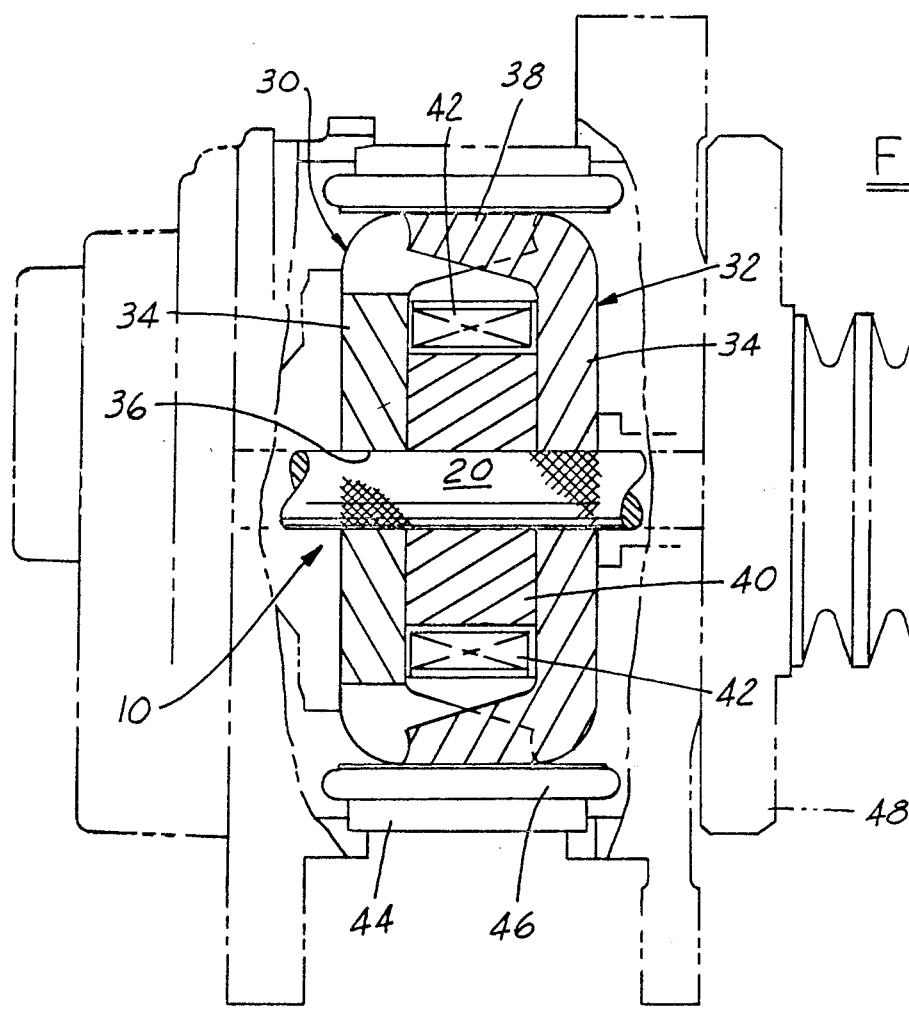
FIG. 10 is a side view of a prior art claw pole alternator with a portion broken away to show the rotor structure.

The alternator field connections in this invention may be either delta or wye connected as in any conventional three phase alternator and rectified to DC as shown in FIG. 8.

The rotor assemblies of these embodiments of the present invention provide several important benefits to alternator design. Because each rotor pole structure is smaller, the alternator will produce more output per unit weight. Also, lower magnetic noise will be generated at a given speed. Because of the reduced size of the pole pieces required in this invention, the cost for producing stampings for use as pole pieces is reduced and therefore machinings or forgings are not required in order to minimize the bend radius problem so as to maximize the surface area of the claw or claws adjacent the stator core.

Another advantage of this invention is that as more flux is produced, for a given output required, the smaller the number of stator winding turns that are required. As losses are primarily due to heating in the stator winding, reducing the winding turns will reduce this heating loss and therefore will increase alternator efficiency. This in turn will then require less power input for a given electrical power output.

From the above description it is seen this invention provides an improved rotor design in an electrical machine, either motor or generator, utilizing multiple magnetic flux paths to facilitate increased electrical output, efficiency, and versatility. The instant invention has been described in an illustrative manner and it is to be understood that the terminology which has been used is intended to be in the nature of words of description rather than of limitation.

Obviously many modifications and variations of the present invention are possible in light of the above teachings. It is therefore to be understood that within the scope of the appended claims, the invention may be practiced otherwise then as specifically described.

What is claimed is:

1. An electrical machine having multiple magnetic flux paths comprising:
   a rotor shaft;
   a plurality of pole structures mounted axially on said rotor shaft, each producing a magnetic flux on a separate flux path, each of said pole structures comprising a pair of pole pieces and an excitation means sandwiched therebetween for generating opposing magnetic polarities in each of said pole pieces forming said separate magnetic flux path;

each of said pair of pole pieces having respective first and second pluralities of axially extending projections, the first plurality of axially extending projections extending toward and being interleaved with the second plurality of axially extending projections;

wherein said excitation means in at least one of said pole structures comprises a non-magnetic sleeve mounted on said rotor shaft between the pole pieces of the at least one of said plurality of pole structures and an annular permanent magnet mounted on said sleeve; and wherein said excitation means of at least another one of said plurality of pole structures comprises a permeable core mounted on said rotor shaft between the pole pieces of the at least another one of said plurality of pole structures, and a conductive coil encircling said core for conducting electrical current therethrough.

* * * * *